PIERCE W. YARRELL.
Improvement in Mill Stone Dress.

No. 125,157.            Patented April 2, 1872.

UNITED STATES PATENT OFFICE.

PIERCE W. YARRELL, OF GARYSBURG, NORTH CAROLINA.

IMPROVEMENT IN MILLSTONE-DRESS.

Specification forming part of Letters Patent No. 125,157, dated April 2, 1872.

*To all whom it may concern:*

Be it known that I, PIERCE W. YARRELL, of Garysburg, in the county of Northampton and State of North Carolina, have invented a certain new and useful Improvement in Millstones; and I do hereby declare the following to be a full, clear, and exact description thereof, reference being had to the accompanying drawing, in which—

Figure 1:
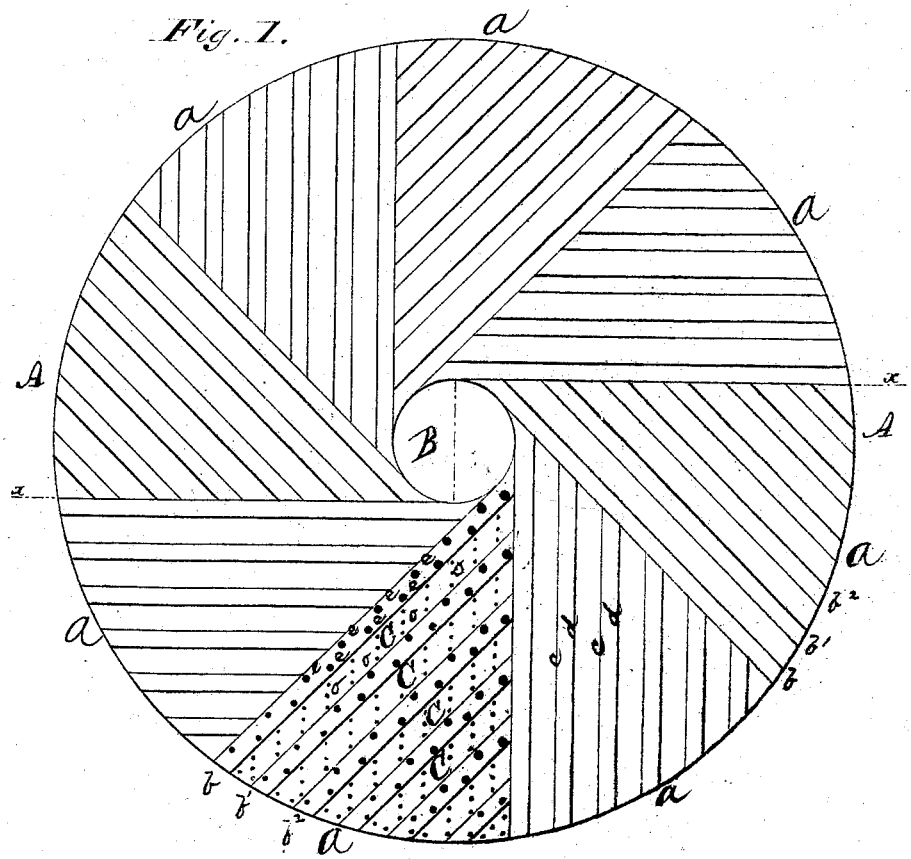
Figure 2:
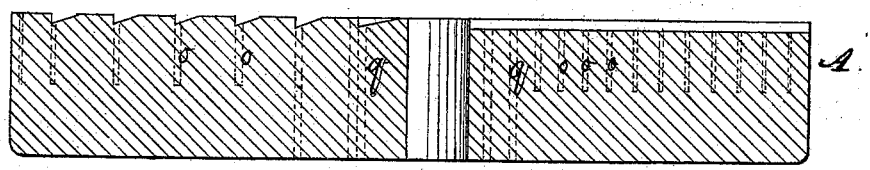
Figure 3:
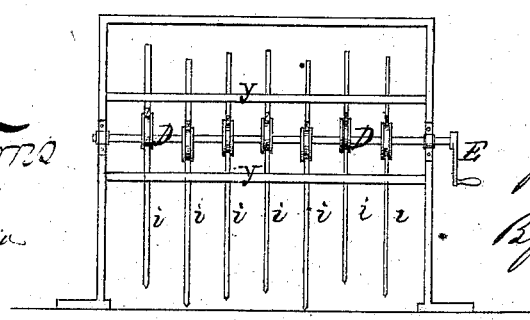

Figure 1 is a top view of a millstone, showing the form of my improved dress. Fig. 2 is a transverse central section on the line $x\ x$ of Fig. 1. Fig. 3 is a front view of a machine adapted to produce the openings in the said millstones.

My invention relates to an improvement in millstone-dress; and it consists in forming a series of holes or perforations in the furrows and grinding-surface, either or both of which extend a short distance down into the stones in such a manner that the edges of the perforations form cutting-edges and perform such function as long as the presence of the perforations exist, or, at least, until the perforations entirely disappear. The invention also consists in forming one or more perforations in each furrow, near the eye of the runner-stone, in such a manner as to extend entirely through the said stone, and thus secure both a cutting-edge and a thorough ventilation.

In the drawing, the letter A designates a millstone having its surface laid off in a series of sections or landings, as shown at $a\ a\ a$, &c. The leading and other furrows $b\ b^1\ b^2$, &c., are formed as usual, with the exception that the front $c$ and back $d$ are provided with a series of perforations, $e\ e\ e$, arranged in rows their entire length or less, if desired, and may extend down into the stone for any suitable depth, and which are preferably alternately arranged, as shown. The diameter of the perforations are preferably made to increase in size from the periphery of the stone toward the eye B. The face or grinding-surface C of the stone is provided with one or more perforations or holes, $o$. By preference three rows are employed, and they extend from the periphery to the next leading furrow of the next section, the said perforations or holes gradually increasing in diameter as they approach the center or next leading land. The depth, size, and number of the perforations may be increased or diminished without departing from the nature and spirit of the invention. The periphery of the edges of the perforations are the cutting-edges, and retain and perform this continuous office or function so long as they are pressed, or, at least, until they wear away by usage of the stone. When the perforations or holes entirely disappear from constant and long use, they can be readily renewed.

The furrows of the runner-stone near its eye are provided with one or more perforations or holes, $g$, which entirely extend through the said stone, by which means a free and perfect ventilation, combined with a continuous cutting-edge, is always present. The lands and furrows serve as guides for the dresser, so that he is enabled to retain the same draught or angle as the millstone wears away, thus almost entirely relieving the dresser of labor on the grinding-surfaces, and of keeping the furrows sufficiently deep for conveying off the flour or meal as fast as ground.

The holes or perforations may be formed by hand, as in drilling; but it is preferable, and less expensive, to use a machine, as shown in Fig. 3, in which a series of rods, $i\ i$, adapted to receive different-sized drill-bits, have an alternate motion imparted to them by a shaft, D, and crank E, the said bit-rods being guided in their alternate up and down movements by cross-bars F F.

The frame supporting the tools, when the same are arranged for operation, is placed upon the stones and, the bits arranged to strike and drill the points desired.

Having thus described my invention, what I claim, and desire to secure by Letters Patent, is—

1. The millstone-dress herein shown, having the front $c$ and back $d$ formed with perforations or holes $e\ e$, for the purpose set forth.

2. The face or grinding-surface C, provided with a series of perforations, $o\ o$, arranged substantially as herein shown, and for the purpose set forth.

3. The perforations $g$ formed in the main or leading furrows near the eye B, and extending through the stone, as and for the purpose set forth.

To the above I have signed my name this 2d day of September, A. D. 1871.

PIERCE W. YARRELL.

Witnesses:
JAMES L. NORRIS,
A. C. NORRIS.